(12) United States Patent
Sugino

(10) Patent No.: US 8,295,334 B2
(45) Date of Patent: Oct. 23, 2012

(54) SIGNAL TRANSMISSION SYSTEM AND RECEIVING APPARATUS

(75) Inventor: Heiichi Sugino, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 439 days.

(21) Appl. No.: 12/693,584

(22) Filed: Jan. 26, 2010

(65) Prior Publication Data

US 2010/0189185 A1 Jul. 29, 2010

(30) Foreign Application Priority Data

Jan. 29, 2009 (JP) .................................. 2009-018854

(51) Int. Cl.
*H04B 1/38* (2006.01)

(52) U.S. Cl. ........ 375/219; 375/296; 375/316; 345/213; 345/520; 345/571

(58) Field of Classification Search .................. 375/219, 375/296, 316; 345/213, 520, 571
See application file for complete search history.

(56) References Cited

U.S. PATENT DOCUMENTS

2004/0252239 A1  12/2004  Niiyama

FOREIGN PATENT DOCUMENTS

JP        2004-356939        12/2004

*Primary Examiner* — Zewdu Kassa
(74) *Attorney, Agent, or Firm* — Staas & Halsey LLP

(57) ABSTRACT

A digital audio signal, a channel clock, and a bit clock are transmitted to the receiving apparatus via a pair of signal lines. The digital audio signal is input to a D/A converter via a first comparator. The channel clock and the bit clock are received, separated with first and second separation circuits, and input to the D/A converter via the second and third comparators. A reference electrical potential of the second comparator is corrected such that it becomes half or approximately half of an amplitude of the channel clock depending on an electrical potential change of the output of a second differential signal receiving circuit. A system clock is generated based on the bit clock. The digital audio signal is converted into the analog audio signal based on the channel clock, the bit clock, and the system clock, and then the converted analog audio signal is output.

12 Claims, 13 Drawing Sheets

THERE IS FG (FLAME GROUND)

THERE IS NO FG (FLAME GROUND)

SIGNAL TRANSMISSION SYSTEM AND RECEIVING APPARATUS

CROSS-REFERENCE TO RELATED APPLICATION

This application is based upon and claims the benefit of priority of the prior Japanese Patent Application No. 2009-018854, filed on Jan. 29, 2009, the entire contents of which are incorporated herein by reference.

FIELD

A certain aspect of the embodiments discussed herein is related to a signal transmission system and a receiving apparatus that can communicate an image signal and an audio signal.

BACKGROUND

Conventionally, there has been known a signal transmission system including: a local unit that transmits an analog image signal (i.e., an RGB signal) output from a computer, and a response signal to the operation of a keyboard and a mouse to a remote place with a Cat 5 (Category 5) cable including four pairs of signal lines; and a remote unit that transmits an operation signal of the keyboard and the mouse to the local unit and receives the analog image signal and the response signal (See Japanese Laid-Open Patent Publication No. 2004-356939).

In the above-mentioned signal transmission system, the local unit transmits the analog image signal to the remote unit with three pairs of signal lines, and transmits the response signal to the remote unit with a remaining pair of signal lines.

In the above-mentioned signal transmission system, when the local unit transmits an analog audio signal from the computer to the remote unit, the local unit converts the analog audio signal in digital form, and transmits three signals of a digital audio signal, a channel clock (LRCK), and a bit clock (BCK) to the remote unit with two pairs of signal lines in the Cat 5 cable. Therefore, when the local unit transmits the analog image signal and the analog audio signal to the remote unit, two Cat 5 cables connected between the local unit and the remote unit are necessary.

SUMMARY

It is an object of the present invention to provide a signal transmission system and a receiving apparatus that can transmit an audio signal with a pair of signal lines included in a network cable.

According to an aspect of the present invention, there is provided a signal transmission system including a receiving apparatus and a transmitting apparatus, including: the transmitting apparatus including: an A/D converter that converts an analog audio signal into a digital audio signal, and outputs the digital audio signal, a channel clock, and a bit clock; and a differential signal transmitting circuit that balanced-transmits the digital audio signal to the receiving apparatus via a pair of signal lines in a network cable, mixes the channel clock and the bit clock, and unbalanced-transmits the mixed channel clock and the mixed bit clock to the receiving apparatus via the pair of signal lines; the receiving apparatus including: a first differential signal receiving circuit that receives the digital audio signal via the pair of signal lines; a second differential signal receiving circuit that receives the mixed channel clock and the mixed bit clock via the pair of signal lines; a first separation circuit that separates the channel clock from an output of the second differential signal receiving circuit; a second separation circuit that separates the bit clock from an output of the second differential signal receiving circuit; a first comparator that compares an output of the first differential signal receiving circuit with a reference electrical potential, and outputs an amplified digital audio signal depending on the result of the comparison; a second comparator that compares an output of the first separation circuit with a reference electrical potential, and outputs an amplified channel clock on the result of the comparison; a third comparator that compares an output of the second separation circuit with a reference electrical potential, and outputs an amplified bit clock on the result of the comparison; a correction circuit that corrects the reference electrical potential of the second comparator such that the reference electrical potential of the second comparator becomes half or approximately half of an amplitude of the channel clock depending on an electrical potential change of the output of the second differential signal receiving circuit; a PLL circuit that converts a frequency of the bit clock output from the third comparator to generate a system clock; and a D/A converter that converts the digital audio signal output from the first comparator into an analog audio signal based on the channel clock output from the second comparator, the bit clock output from the third comparator, and the system clock generated with the PLL circuit, and outputs the analog audio signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will now be given, with reference to the accompanying drawings, of an embodiment of the present invention.

Figure 1:
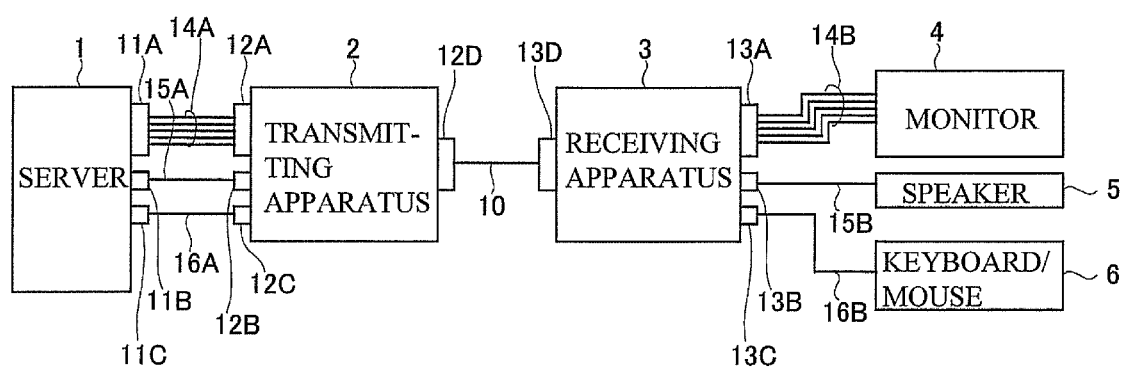
FIG. 1 is a block diagram showing the construction of a signal transmission system according to a present embodiment.

FIG. 1 is a block diagram showing the construction of a signal transmission system according to a present embodiment.

In the signal transmission system, a transmitting apparatus 2 and a receiving apparatus 3 are provided between a server 1 composed of a personal computer, a work station, or the like, and a monitor 4, a speaker 5 and a keyboard and mouse 6 (hereinafter referred to as "keyboard/mouse"), as shown in FIG. 1.

The transmitting apparatus 2 and the receiving apparatus 3 are connected to each other via a LAN (Local Area Network) cable 10. Exclusive interfaces 12D and 13D (hereinafter the interface will be referred to as "I/F") are installed in the transmitting apparatus 2 and the receiving apparatus 3, respectively. The exclusive I/Fs 12D and 13D connect the transmitting apparatus 2 and the receiving apparatus 3 to each other by a one-on-one relationship. The exclusive I/F 12D transmits three image signals, a horizontal synchronizing signal (Hsync), a vertical synchronizing signal (Vsync), and an audio signal (a sound signal) output from the server 1, to the exclusive I/F 13D, and receives a signal input from the keyboard/mouse 6 (referred to as "operation signal") from the exclusive I/F 13D. The three image signals are RGB signals. When any one of the RGB signals is not selected, the RGB signals will be hereinafter simply referred to as "image signals". Similarly, when any one of the horizontal and vertical synchronizing signals is not selected, these signals will be hereinafter simply referred to as "synchronizing signals". The exclusive I/F 13D receives the image signals, the synchronizing signals, and the audio signal from the exclusive I/F 12D, and transmits the operation signal to the exclusive I/F 12D.

The LAN cable 10 is a Cat 5E straight cable, for example, and includes four pairs of signal lines (i.e., eight signal lines in total). Since each of the image signals is transmitted from the transmitting apparatus 2 to the receiving apparatus 3 as differential signals, a pair of signal lines is occupied for each of the image signals. Therefore, the three image signals, i.e., the RGB signals occupy three pairs of signal lines. A remaining pair of signal lines is used for transmitting the audio signal from the transmitting apparatus 2 to the receiving apparatus 3, or transmitting the operation signal inputted from the keyboard/mouse 6 from the receiving apparatus 3 to the transmitting apparatus 2 and transmitting the signal outputted from the server 1 from the transmitting apparatus 2 to the receiving apparatus 3. The horizontal synchronizing signal is multiplexed with a G-signal of the RGB signal, the vertical synchronizing signal is multiplexed with a B-signal of the RGB signal, and hence each of the horizontal and vertical synchronizing signals does not independently occupy the signal lines.

The transmitting apparatus 2 includes a VGA (Video Graphics Array) connector 12A as a display connector for inputting the image signals (RGB), the horizontal synchronizing signal, and the vertical synchronizing signal from the server 1. As the VGA connector 12A, a general connector such as a BNC (Bayonet Neill Concelman) connector, and a D-sub 15 pin connector can be used.

The transmitting apparatus 2 also includes a connector 12C for inputting the audio signal from the server 1 and the I/F 12D for inputting the operation signal of the keyboard/mouse 6 inputted via the receiving apparatus 3.

Similarly to a general information processing apparatus, a VGA connector 11A outputting the image signals (RGB), a connector 11B outputting the audio signal, and a connector 11C inputting the operation signal from a keyboard and a mouse are provided on the server 1.

The VGA connector 12A provided on the transmitting apparatus 2 is connected to the VGA connector 11A provided on the server 1 via a RGB cable 14A composed of a BNC cable, a D-sub 15 pin cable, or the like. The connector 12B provided on the transmitting apparatus 2 is connected to the connector 11B provided on the server 1 via a cable 15A. The connector 12C provided on the transmitting apparatus 2 is connected to the connector 11C provided on the server 1 via a cable 16A used for connecting a general keyboard and a general mouse. The connector 11C and the connector 12C are composed of a USB (Universal Serial Bus) connector, a PS/2 connector, or the like. The cable 16A is composed of a USB (Universal Serial Bus) cable, a PS/2 cable, or the like.

The receiving apparatus 3 includes a VGA (Video Graphics Array) connector 13A as a display connector for outputting the image signals (RGB), the horizontal synchronizing signal, and the vertical synchronizing signal to the monitor 4. A general connector such as a BNC (Bayonet Neill Concelman) connector, and a D-sub 15 pin connector can be used as the VGA connector 13A. An RGB cable 14B provided on the monitor 4 is connected to the VGA connector 13A. For example, the RGB cable 14B is composed of the BNC cable, the D-sub 15 pin cable, or the like.

The receiving apparatus 3 includes a connector 13B for outputting the audio signal to the speaker 5, and a connector 13C for inputting the operation signal from the keyboard/mouse 6. A cable 15B provided on the speaker 5 is connected to the connector 13B, and a cable 16B provided on the keyboard/mouse 6 is connected to the connector 13C. The connector 13C is composed of the USB (Universal Serial Bus) connector, the PS/2 connector, or the like. The cable 16B is composed of the USB cable, the PS/2 cable, or the like.

Next, a detailed description will be given of the internal construction of the transmitting apparatus 2 and the receiving apparatus 3 with reference to the drawings. A description will be given of an example of the case where the horizontal synchronizing signal is multiplexed with the image signal (G) in the RGB image signals, and the vertical synchronizing signal is multiplexed with the image signal (B).

Figure 2A:
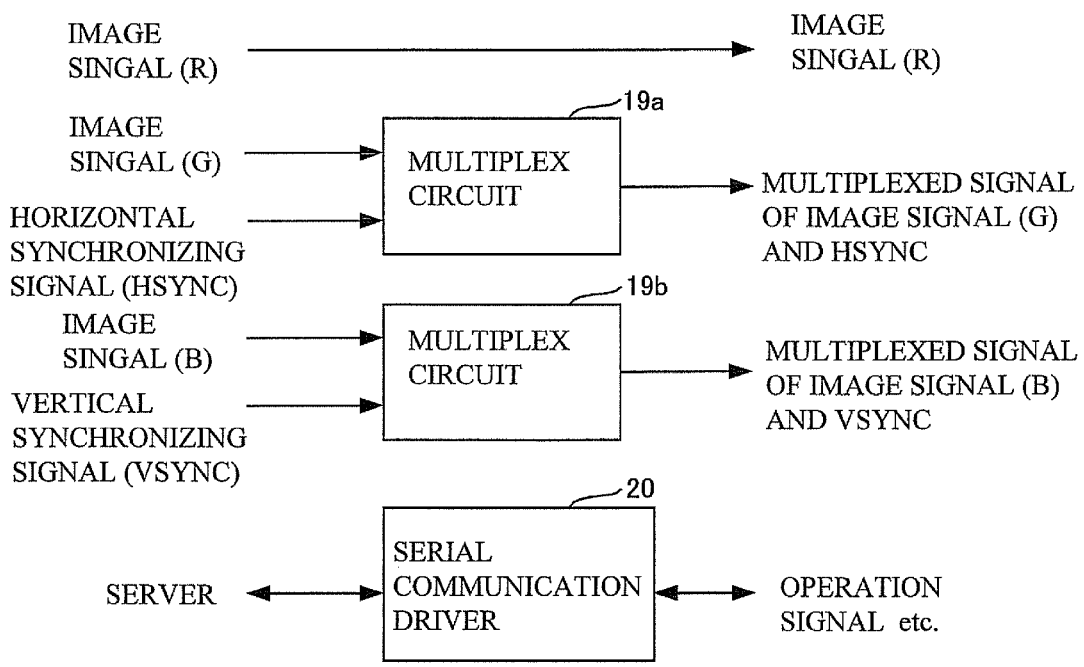
FIG. 2A is a block diagram showing the construction of a transmitting apparatus 2 relating to image signals and an operation signal.

FIG. 2A is a block diagram showing the construction of the transmitting apparatus 2 relating to the image signals and the operation signal. As shown in FIG. 2A, the transmitting apparatus 2 includes: multiplex circuits 19a and 19b for multiplexing the horizontal synchronizing signal with the image signal (G) of the RGB image signals input from the VGA connector 12A, and multiplexing the vertical synchronizing signal with the image signal (B) of the RGB image signals input from the VGA connector 12A; and a serial communication driver 20.

The multiplex circuit 19a inputs the image signal (G) of the RGB image signals, and the horizontal synchronizing signal, multiplexes the horizontal synchronizing signal with the image signal (G), and outputs the multiplexed signal to the receiving apparatus 3. Similarly, the multiplex circuit 19b inputs the image signal (B) of the RGB image signals, and the vertical synchronizing signal, multiplexes the vertical synchronizing signal with the image signal (B), and outputs the multiplexed signal to the receiving apparatus 3. It should be noted that a voltage level of general image signals (RGB) is about 1V even if it is high, and a voltage level of general synchronizing signals is about 5V equal to an internal voltage level. The serial communication driver 20 is composed of an RS-485 serial communication driver, outputs the operation signal received from the receiving apparatus 3 to the server 1, and transmits a signal from the server 1 to the receiving apparatus 3.

Figure 2B:
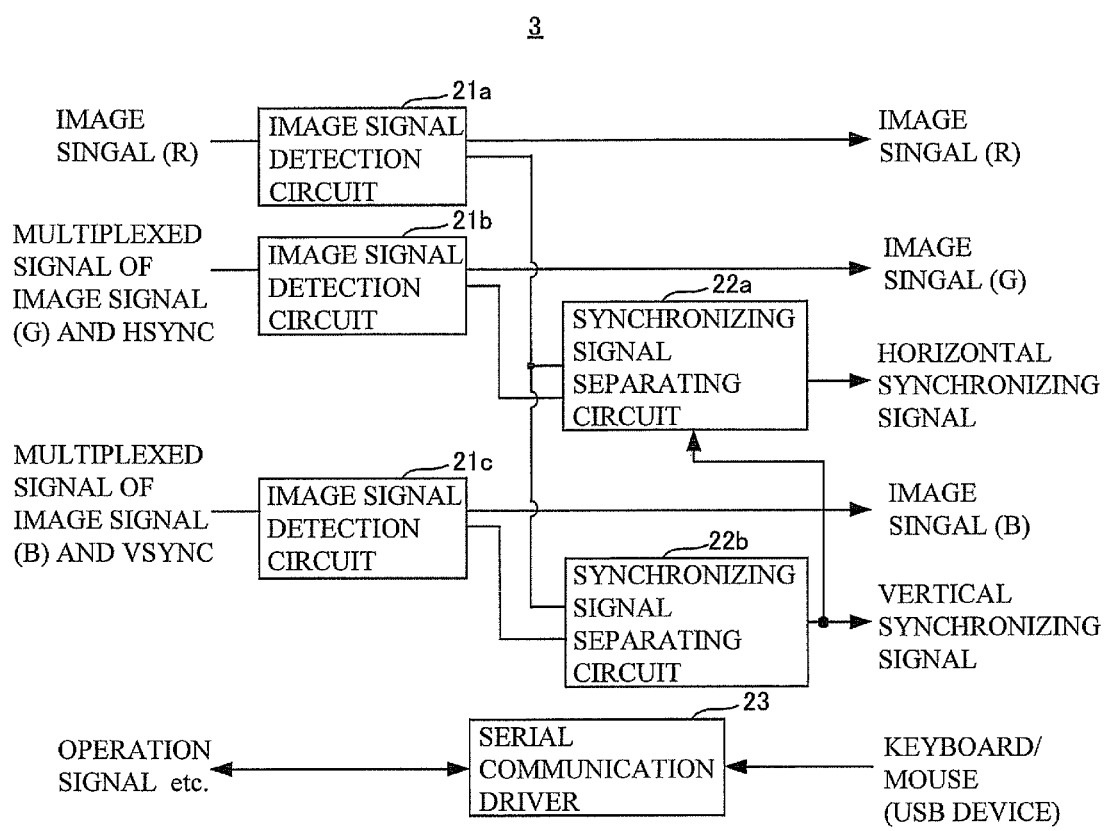
FIG. 2B is a block diagram showing the construction of a receiving apparatus 3 relating to the image signals and the operation signal.

FIG. 2B is a block diagram showing the construction of the receiving apparatus 3 relating to the image signals and the operation signal.

The receiving apparatus 3 includes image signal detection circuits 21a to 21c, synchronizing signal separating circuits 22a and 22b, and a serial communication driver 23.

The image signal detection circuits 21a to 21c detect the image signal (R), the image signal (G), and the image signal (B) from plural signals received by the exclusive I/F 13D, respectively. The synchronizing signal separating circuit 22b separates the vertical synchronizing signal from a common-mode signal output from the image signal detection circuit 21c, based on a common-mode signal output from the image signal detection circuit 21a. Based on the common-mode signal and the vertical synchronizing signal output from the image signal detection circuit 21a, the synchronizing signal separating circuit 22a separates the horizontal synchronizing signal from which influence of the crosstalk by the vertical synchronizing signal is excluded, from a common-mode signal output from the image signal detection circuit 21b.

The serial communication driver 23 is composed of the RS-485 serial communication driver, outputs the operation signal received from the keyboard/mouse 6 to the transmitting apparatus 2, and transmits a signal from the transmitting apparatus 2 to a USB device, not shown.

Figure 3A:
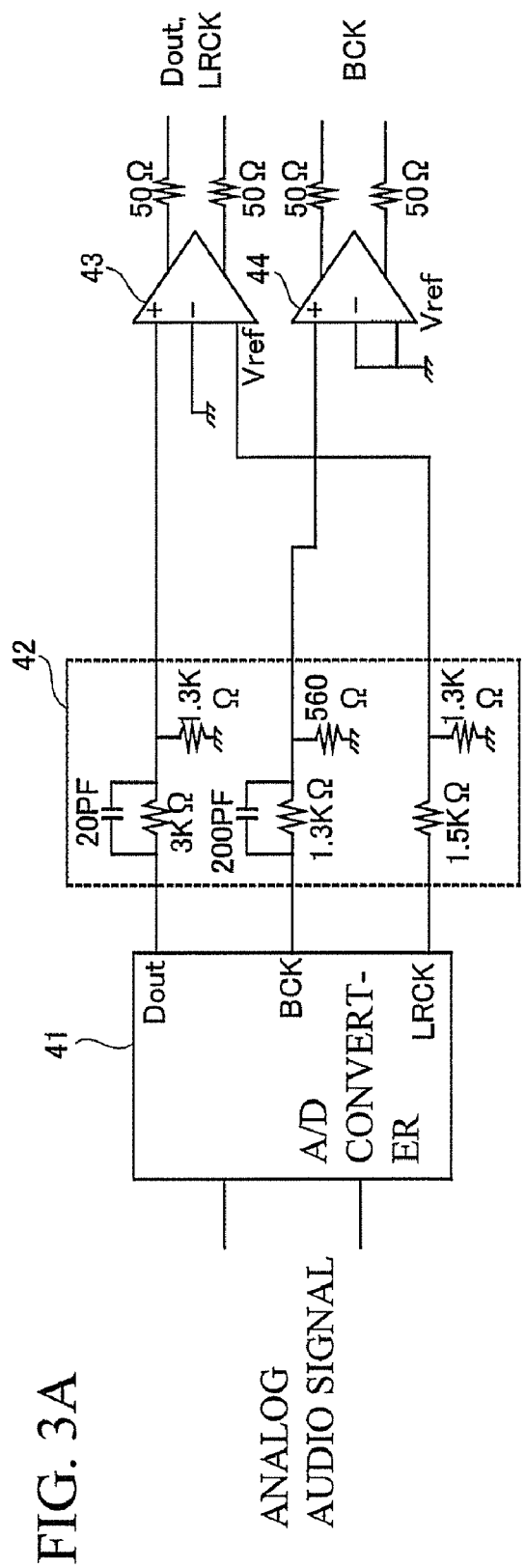
FIG. 3A is a block diagram showing the construction of a conventional transmitting apparatus relating to an audio signal.
Figure 3B:
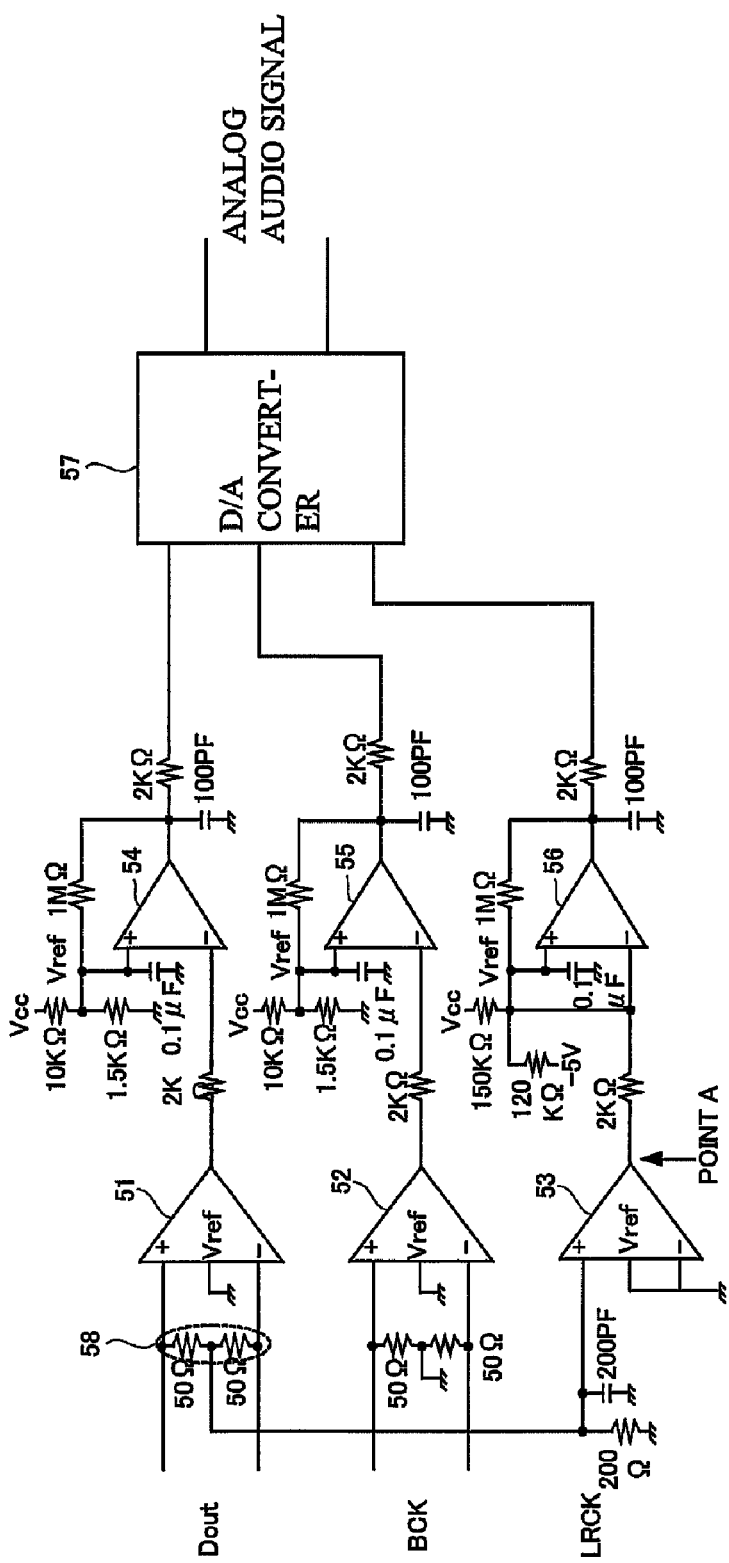
FIG. 3B is a block diagram showing the construction of a conventional receiving apparatus relating to the audio signal.

FIG. 3A is a block diagram showing the construction of a conventional transmitting apparatus relating to an audio signal. FIG. 3B is a block diagram showing the construction of a conventional receiving apparatus relating to the audio signal.

In FIG. 3A, the conventional transmitting apparatus includes an A/D converter 41, an attenuator 42, and differential signal transmitting circuits 43 and 44. The A/D converter 41 inputs an analog audio signal from the server, converts the analog audio signal into a digital audio signal (Dout), and outputs three signals of the digital audio signal (Dout), a channel clock (LRCK), and a bit clock (BCK). The attenuator 42 attenuates the output of the digital audio signal (Dout), the channel clock (LRCK), and the bit clock (BCK). This is to decrease an EMI noise to the image signals. The differential signal transmitting circuit 43 inputs the digital audio signal (Dout) and the channel clock (LRCK), executes balanced transmission of the digital audio signal (Dout) to the conventional receiving apparatus via the LAN cable 10, and executes unbalanced transmission of the channel clock (LRCK) to the conventional receiving apparatus via the LAN cable 10. The differential signal transmitting circuit 44 inputs the bit clock (BCK) and executes balanced transmission of the bit clock (BCK) to the conventional receiving apparatus via the LAN cable 10. The frequency of the channel clock (LRCK) is 44.1 kHz, and the frequency of bit clock (BCK) is 2.8 MHz.

Thus, the conventional transmitting apparatus transmits the digital audio signal (Dout), the channel clock (LRCK), and the bit clock (BCK) to the conventional receiving apparatus with two pairs of signal lines in the LAN cable.

In FIG. 3B, the conventional receiving apparatus includes differential signal receiving circuits 51 to 53, comparators 54 and 55, and a D/A (Digital-to-Analog) converter 57. The differential signal receiving circuit 51 inputs the digital audio signal (Dout) balanced-transmitted from the differential signal transmitting circuit 43. The comparator 54 compares the output from the differential signal receiving circuit 51 with a reference electrical potential Vref, and outputs to the D/A converter 57 the digital audio signal (Dout) in which the output from the differential signal receiving circuit 51 is amplified depending on the result of the comparison.

The differential signal receiving circuit 52 inputs the bit clock (BCK) balanced-transmitted from the differential signal transmitting circuit 44. The comparator 55 compares the output from the differential signal receiving circuit 52 with a reference electrical potential Vref, and outputs to the D/A converter 57 the bit clock (BCK) in which the output from the differential signal receiving circuit 52 is amplified depending on the result of the comparison.

The differential signal receiving circuit 53 inputs the channel clock (LRCK) unbalanced-transmitted from the differential signal transmitting circuit 43, from a midpoint of a terminating resistance 58. A comparator 56 compares the output from the differential signal receiving circuit 53 with a reference electrical potential Vref, and outputs to the D/A converter 57 the channel clock (LRCK) in which the output from the differential signal receiving circuit 53 is amplified depending on the result of the comparison.

The D/A converter 57 converts the digital audio signal (Dout) into an analog audio signal based on the input bit clock (BCK) and the input channel clock (LRCK), and outputs the converted analog audio signal to a speaker, not shown.

Figure 4:
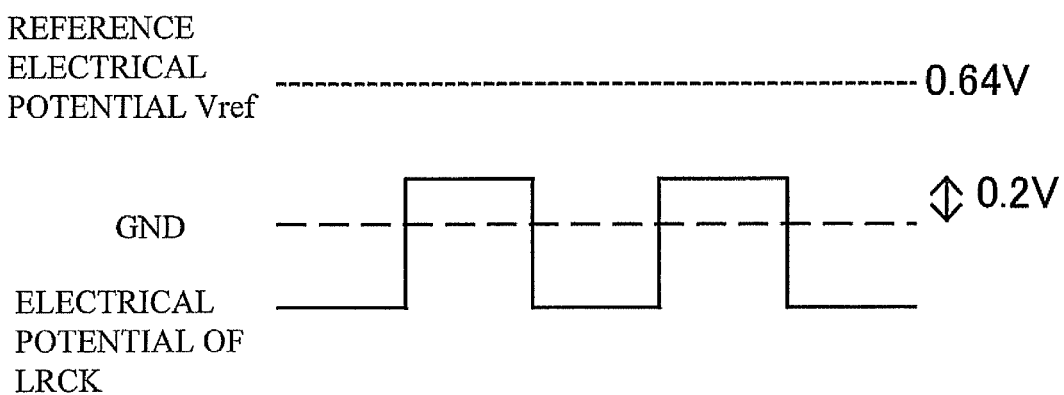
FIG. 4 is a diagram showing a waveform of an electrical potential of a channel clock (LRCK) when there are no frame grounds of the transmitting apparatus 2 and the receiving apparatus 3.

In the conventional receiving apparatus and the conventional transmitting apparatus of FIGS. 3A and 3B, when there are no frame grounds (FG), the electrical potential of a point A on an output side of the differential signal receiving circuit 53 becomes a waveform as shown in FIG. 4. That is, the channel clock (LRCK) is transmitted by centering a ground (GND), and always falls below the reference electrical potential Vref of the comparator 56, so that the comparator 56 does not work normally. That is, the channel clock (LRCK) is not transmitted from the transmitting apparatus 2 to the receiving apparatus 3 accurately. Consequently, a noise may be included in the analog audio system signal converted with the D/A converter 57.

Figure 5A:
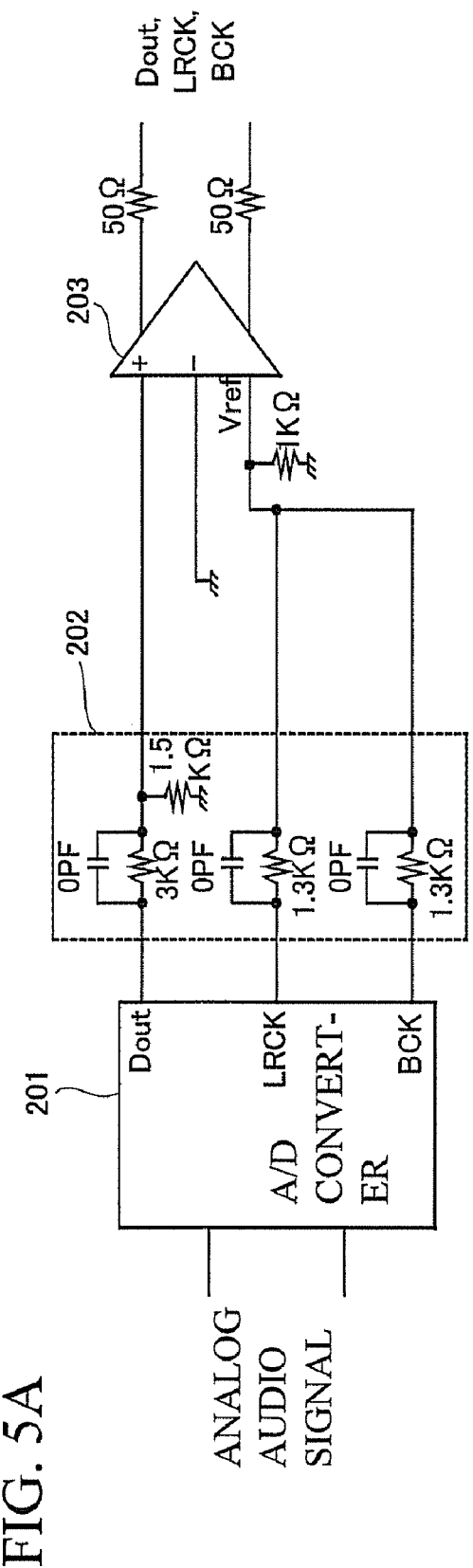
FIG. 5A is a block diagram showing the construction of the transmitting apparatus 2 relating to the audio signal.
Figure 5B:
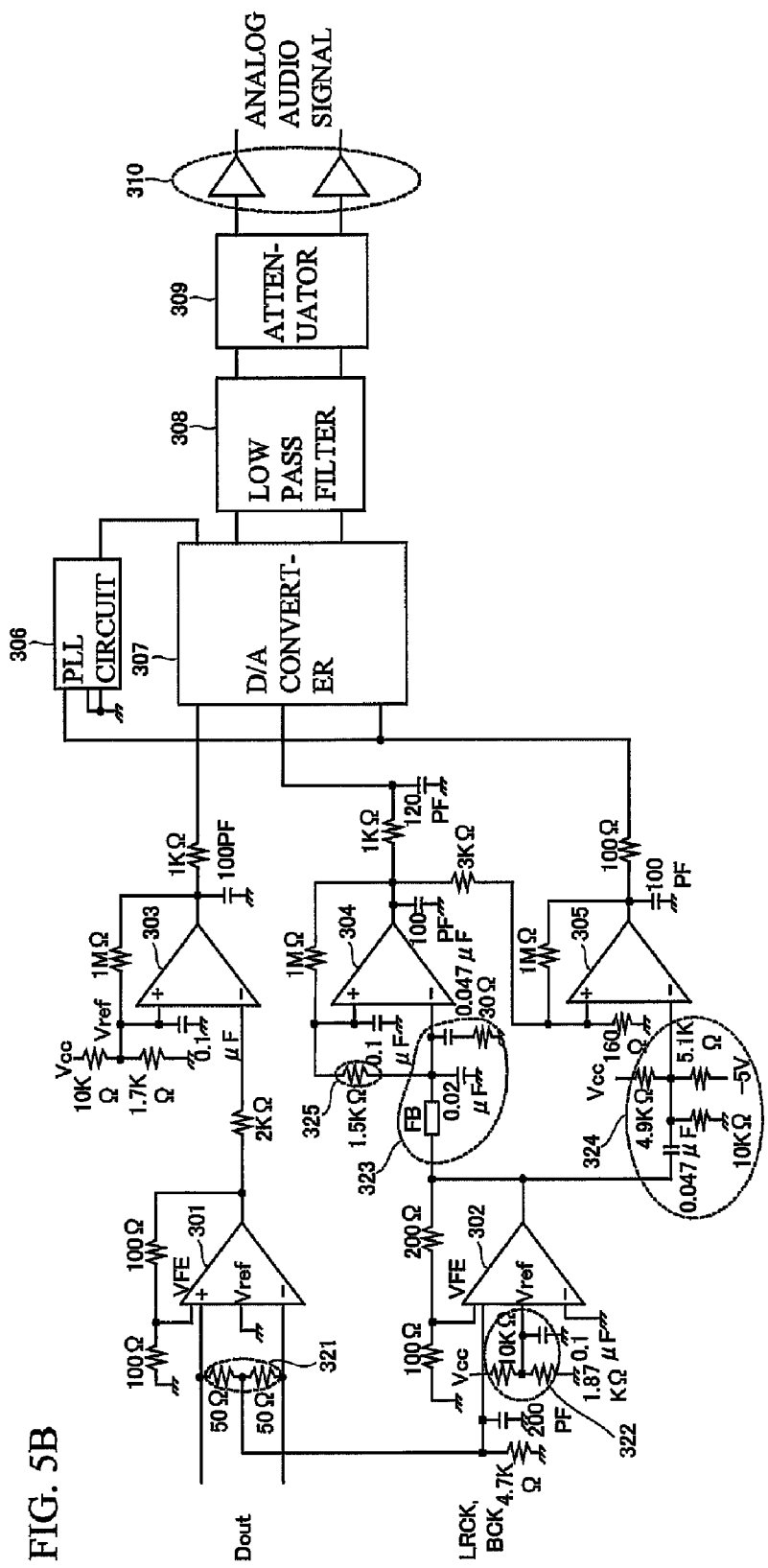
FIG. 5B is a block diagram showing the construction of the receiving apparatus 3 relating to the audio signal.

FIG. 5A is a block diagram showing the construction of the transmitting apparatus 2 relating to the audio signal, and FIG. 5B is a block diagram showing the construction of the receiving apparatus 3 relating to the audio signal.

In FIG. 5A, the transmitting apparatus 2 includes an A/D (Analog-to-Digital) converter 201, an attenuator 202, and a differential signal transmitting circuit 203. The A/D converter 201 inputs an analog audio signal from the server 1, converts the analog audio signal into a digital audio signal (Dout), and outputs three signals, i.e., the digital audio signal (Dout), a channel clock (LRCK), a bit clock (BCK). The attenuator 202 attenuates the output of the digital audio signal (Dout), the channel clock (LRCK), and the bit clock (BCK). This is to decrease an EMI noise to the image signals.

The differential signal transmitting circuit 203 is composed of a differential twisted-pair driver. The differential signal transmitting circuit 203 inputs the digital audio signal (Dout), the channel clock (LRCK), and the bit clock (BCK), executes balanced transmission of the digital audio signal (Dout) to the receiving apparatus 3 via a pair of signal lines in the LAN cable 10, mixes the channel clock (LRCK) and the bit clock (BCK), and executes unbalanced transmission of the mixed channel clock (LRCK) and the mixed bit clock (BCK) to the receiving apparatus 3 via a pair of signal lines in the LAN cable 10. The frequency of the channel clock (LRCK) is 44.1 kHz, and the frequency of bit clock (BCK) is 2.8 MHz.

In FIG. 5B, the receiving apparatus 3 includes differential signal receiving circuits 301 and 302 (a first differential signal receiving circuit, and a second differential signal receiving circuit) composed of differential line receivers, comparators 303 to 305 (first to third comparators), a PLL (Phase-Locked Loop) circuit 306, a D/A converter 307, a low pass filter 308, an attenuator 309, and an amplifier 310. The receiving apparatus 3 further includes a terminating resistance 321, a bias applying circuit 322, a LRCK clock separation circuit 323 (a first separation circuit), a BCK clock separation circuit 324 (a second separation circuit), and a LRCK electrical potential automatic correction circuit 325 (a correction circuit).

The differential signal receiving circuit 301 inputs the digital audio signal (Dout) balanced-transmitted from the differential signal transmitting circuit 203. The comparator 303 compares the output from the differential signal receiving circuit 301 with a reference electrical potential Vref, and outputs to the D/A converter 307 the digital audio signal (Dout) in which the output from the differential signal receiving circuit 301 is amplified depending on the result of the comparison.

When there are no flame grounds (FG) of the transmitting apparatus 2 and the receiving apparatus 3, the channel clock (LRCK) shifts in a negative direction by centering on the ground (GND). The bias applying circuit 322 therefore applies a bias of about 0.8V to the reference electrical potential Vref of the differential signal receiving circuit 302, so that the bias applying circuit 322 normally works the comparators 304 and 305 arranged at subsequent stages.

The differential signal receiving circuit 302 inputs the channel clock (LRCK) and the bit clock (BCK) unbalanced-transmitted from the differential signal transmitting circuit 203, from a midpoint of the terminating resistance 321.

Figure 6A:
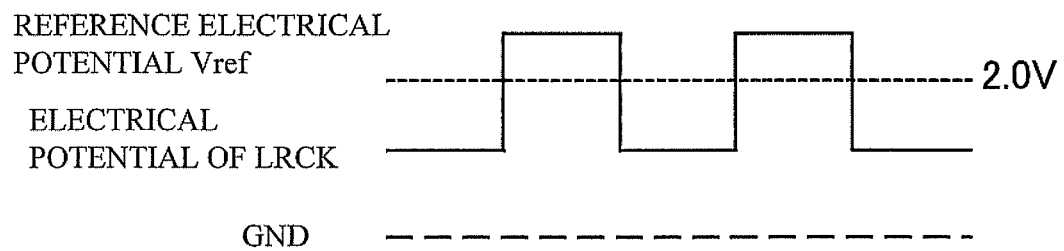
FIG. 6A is a diagram showing a relationship between a reference electrical potential Vref of a comparator 304 corrected by an LRCK electrical potential automatic correction circuit 325 and a pulse of the channel clock (LRCK) when there are frame grounds of the transmitting apparatus 2 and the receiving apparatus 3.
Figure 6B:
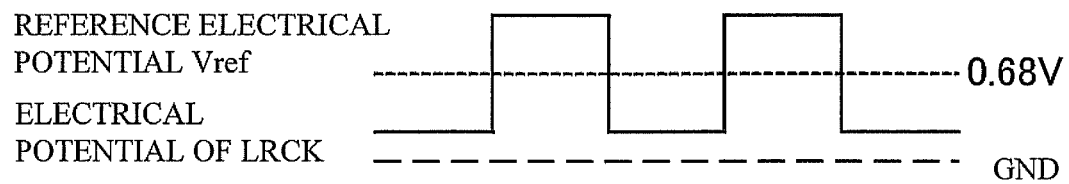
FIG. 6B is a diagram showing a relationship between the reference electrical potential Vref of the comparator 304 corrected by the LRCK electrical potential automatic correction circuit 325 and the pulse of the channel clock (LRCK) when there are no frame grounds of the transmitting apparatus 2 and the receiving apparatus 3.

The LRCK clock separation circuit 323 is composed of a low pass filter, cuts the pulses of the bit clock (BCK) from the output of the differential signal receiving circuit 302, and causes the pulses of the channel clock (LRCK) to go through to the comparator 304. The LRCK electrical potential automatic correction circuit 325 is composed of a resistance. The LRCK electrical potential automatic correction circuit 325 corrects a reference electrical potential Vref of the comparator 304 such that the reference electrical potential Vref of the comparator 304 becomes half or approximately half of the amplitude of the channel clock (LRCK) depending on the electrical potential change of the output of the differential signal receiving circuit 302 caused by the existence or nonexistence of the FGs (flame grounds) of the transmitting apparatus 2 and the receiving apparatus 3. Here, FIGS. 6A and 6B show relationships between the reference electrical potential Vref of the comparator 304 corrected by the LRCK electrical potential automatic correction circuit 325 and the pulses of channel clock (LRCK) when there are flame grounds or no flame grounds of the transmitting apparatus 2 and the receiving apparatus 3, respectively.

The receiving apparatus 3 includes the LRCK electrical potential automatic correction circuit 325 that corrects the reference electrical potential Vref of the comparator 304 such that the reference electrical potential Vref of the comparator 304 becomes half or approximately half of the amplitude of the channel clock (LRCK) depending on the electrical potential change of the output of the differential signal receiving circuit 302. Therefore, the comparator 304 comes to work normally regardless of existence or nonexistence of the FGs (frame grounds) of the transmitting apparatus 2 and the receiving apparatus 3.

The comparator 304 compares the channel clock (LRCK) separated by the LRCK clock separation circuit 323 with the corrected reference electrical potential Vref, and outputs an amplified channel clock (LRCK) depending on the result of the comparison to the D/A converter 307.

The BCK clock separation circuit 324 is composed of a high pass filter, cuts the pulses of the channel clock (LRCK) from the output of the differential signal receiving circuit 302, and causes the pulses of the bit clock (BCK) to go through to the comparator 305. The comparator 305 compares the bit clock (BCK) separated by the BCK clock separation circuit 324 with the reference electrical potential Vref, and outputs an amplified bit clock (LRCK) depending on the result of the comparison to the D/A converter 307 and the PLL circuit 306. The PLL circuit 306 converts 2.8 MHz of a frequency of the bit clock (BCK) into 11.2 MHz, and outputs the converted bit clock (BCK) to an input port for a system clock of the D/A converter 307.

The D/A converter 307 converts the digital audio signal (Dout) into the analog audio signal based on the input channel clock (LRCK), the input bit clock (BCK), and the input system clock, and outputs the analog audio signal to the low pass filter 308. A noise of the analog audio signal is removed with the low pass filter 308, and then the analog audio signal is output through the attenuator 309, the amplifier 310, and the speaker 5.

According to the transmitting apparatus 2 in FIG. 5A and the receiving apparatus 3 in FIG. 5B, the digital audio signal is balanced-transmitted to the receiving apparatus 3 via a pair of signal lines in the LAN cable 10, and the channel clock (LRCK) and the bit clock (BCK) are unbalanced-transmitted to the receiving apparatus 3 via the same pair of signal lines. The digital audio signal is received with the differential signal receiving circuit 301, and is input to the D/A converter 307 via the comparator 303. The channel clock (LRCK) and the bit clock (BCK) are received with the differential signal receiving circuit 302, separated with the LRCK clock separation circuit 323 and the BCK clock separation circuit 324, and input to the D/A converter 307 via the comparators 304 and 305. Then, the reference electrical potential Vref of the comparator 304 is corrected such that the reference electrical potential Vref of the comparator 304 becomes half or approximately half of the amplitude of the channel clock (LRCK) depending on the electrical potential change of the output of the differential signal receiving circuit 302. The system clock is generated based on the bit clock. The digital audio signal is converted into the analog audio signal based on the channel clock (LRCK), the bit clock (BCK), and the system clock, and then the converted analog audio signal is output.

It is therefore possible to transmit the audio signal with a pair of signal lines included in a network cable. Regardless of existence or nonexistence of the FGs (frame grounds) of the transmitting apparatus 2 and the receiving apparatus 3, the channel clock (LRCK) is accurately transmitted from the transmitting apparatus 2 to the receiving apparatus 3, so that the generation of a noise caused in a conventional signal transmission system can be prevented.

Also, the transmitting apparatus 2 transmits the image signals to the receiving apparatus 3 via the three pairs of signal lines in the LAN cable 10, and transmits the audio signal to the receiving apparatus 3 via the remaining pair of signal lines in the LAN cable 10, so that the transmitting apparatus 2 can transmit the image signals and the audio signal to the receiving apparatus 3 with only the single LAN cable 10.

Figure 7A:
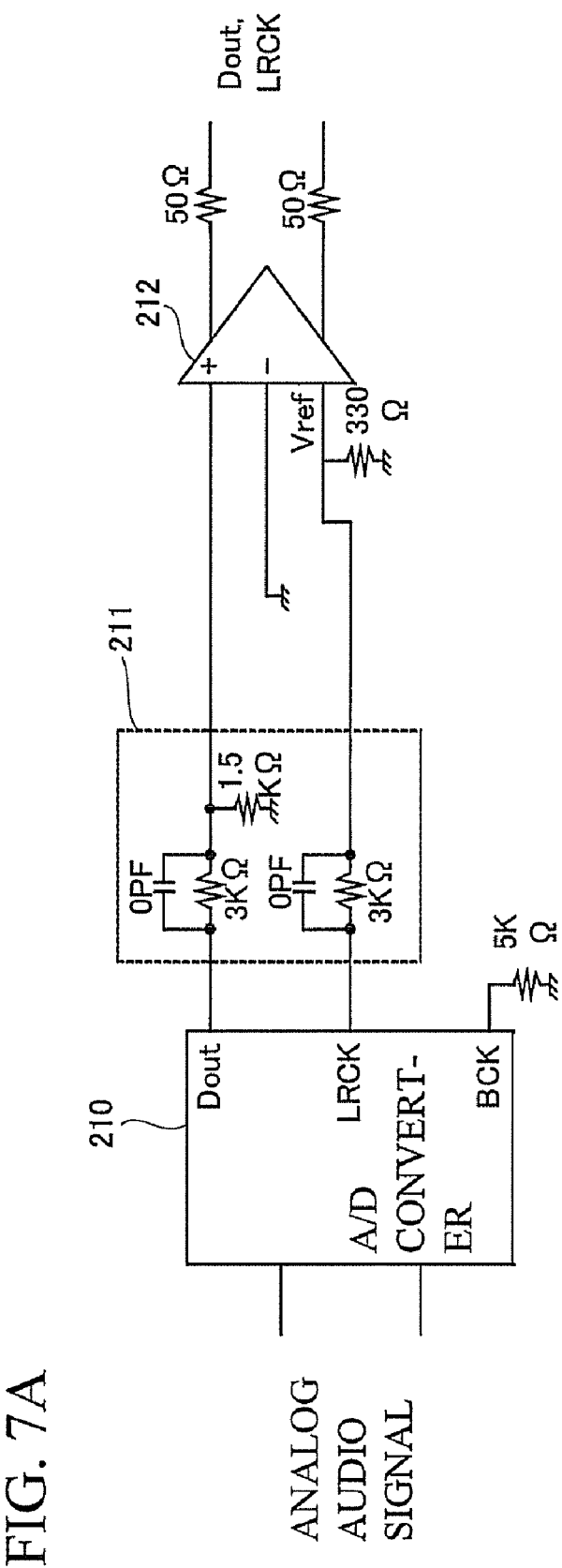
FIG. 7A is a block diagram showing a first variation of the construction of the transmitting apparatus 2 relating to the audio signal.
Figure 7B:
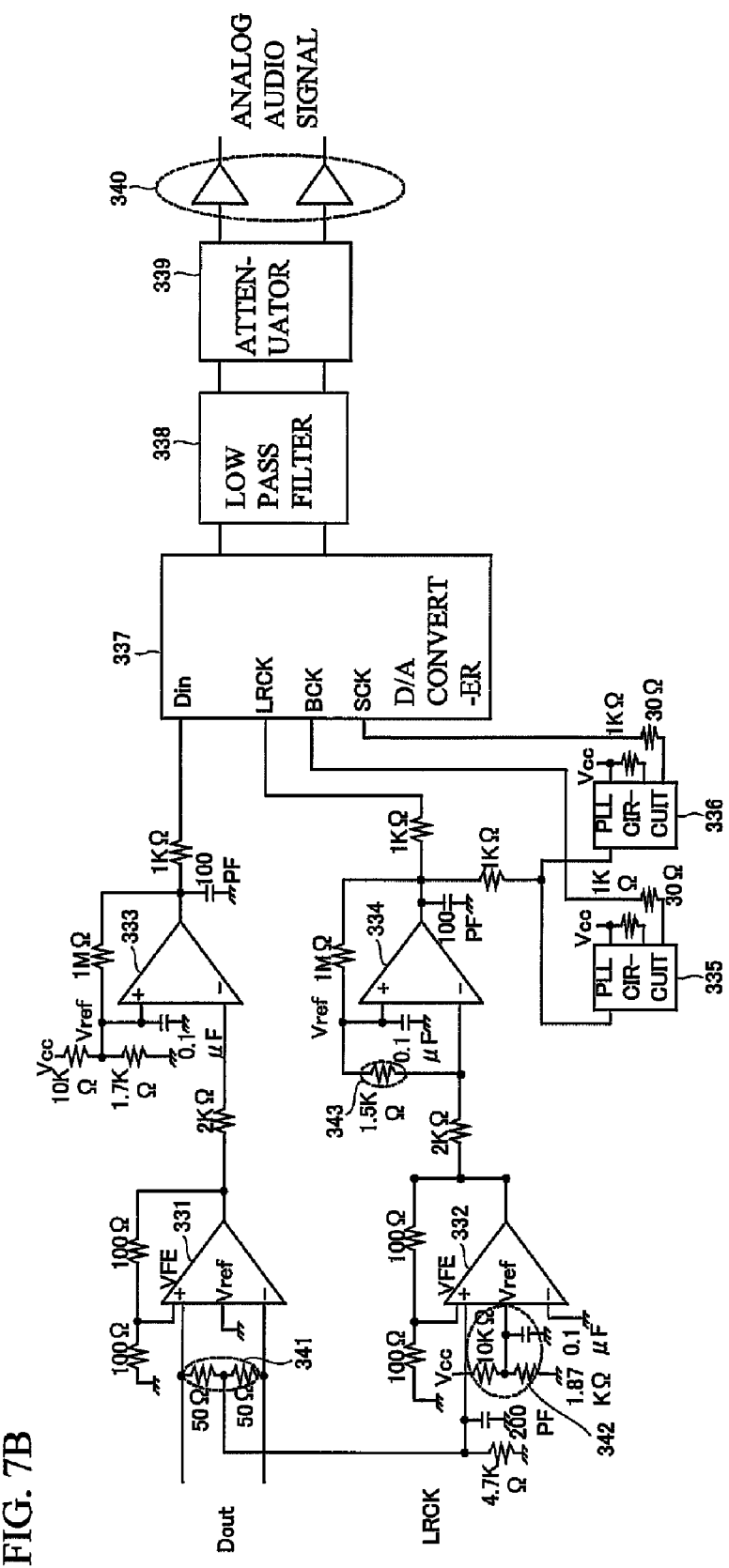
FIG. 7B is a block diagram showing a first variation of the construction of the receiving apparatus 3 relating to the audio signal.

FIG. 7A is a block diagram showing a first variation of the construction of the transmitting apparatus 2 relating to the audio signal. FIG. 7B is a block diagram showing a first variation of the construction of the receiving apparatus 3 relating to the audio signal.

In FIG. 7A, the transmitting apparatus 2 includes an A/D converter 210, an attenuator 211, and a differential signal transmitting circuit 212. The A/D converter 210 inputs an analog audio signal from the server 1, converts the analog audio signal into a digital audio signal (Dout), and outputs three signals, i.e., the digital audio signal (Dout), a channel clock (LRCK), and a bit clock (BCK). An output port for the bit clock (BCK) in the A/D converter 210 is grounded, and the bit clock (BCK) is not output to the receiving apparatus 3.

The attenuator 211 attenuates the output of the digital audio signal (Dout) and the channel clock (LRCK). This is to decrease an EMI noise to the image signals. The differential signal transmitting circuit 212 is composed of a differential twisted-pair driver, for example. The differential signal transmitting circuit 212 inputs the digital audio signal (Dout) and the channel clock (LRCK), balanced-transmits the digital audio signal (Dout) to the receiving apparatus 3 via the LAN cable 10, and unbalanced-transmits the channel clock (LRCK) to the receiving apparatus 3 via the LAN cable 10. The frequency of the channel clock (LRCK) is 44.1 kHz, and the frequency of bit clock (BCK) is 2.8 MHz.

In FIG. 7B, the receiving apparatus 3 includes differential signal receiving circuits 331 and 332 (a first differential signal receiving circuit and a second differential signal receiving circuit) composed of differential line receivers, comparators 333 and 334 (a first comparator and a second comparator), PLL circuits 335 and 336, a D/A converter 337, a low pass filter 338, an attenuator 339, and an amplifier 340. The receiving apparatus 3 further includes a terminating resistance 341, a bias applying circuit 342, and an LRCK electrical potential automatic correction circuit 343 (a correction circuit).

The differential signal receiving circuit 331 inputs the digital audio signal (Dout) balanced-transmitted from the differential signal transmitting circuit 212. The comparator 333 compares the output from the differential signal receiving circuit 331 with a reference electrical potential Vref, and outputs to the D/A converter 337 the digital audio signal (Dout) in which the output from the differential signal receiving circuit 331 is amplified depending on the result of the comparison.

When there are no flame grounds (FG) of the transmitting apparatus 2 and the receiving apparatus 3, the channel clock (LRCK) shifts in a negative direction by centering on the ground (GND). The bias applying circuit 342 therefore applies a bias of about 0.8V to the reference electrical potential Vref of the differential signal receiving circuit 332, so that the bias applying circuit 342 normally works the comparator 334 arranged at a subsequent stage.

The differential signal receiving circuit 332 inputs the channel clock (LRCK) unbalanced-transmitted from the differential signal transmitting circuit 212, from a midpoint of the terminating resistance 341.

The LRCK electrical potential automatic correction circuit 343 is composed of a resistance. The LRCK electrical potential automatic correction circuit 343 corrects a reference electrical potential Vref of the comparator 334 such that the reference electrical potential Vref of the comparator 334 becomes half or approximately half of the amplitude of the channel clock (LRCK) depending on the electrical potential change of the output of the differential signal receiving circuit 332 caused by the existence or nonexistence of the FGs (flame grounds) of the transmitting apparatus 2 and the receiving apparatus 3. Since the receiving apparatus 3 includes the LRCK electrical potential automatic correction circuit 343, the comparator 334 comes to work normally regardless of existence or nonexistence of the FGs (frame grounds) of the transmitting apparatus 2 and the receiving apparatus 3.

The comparator 334 compares the output of the differential signal receiving circuit 332 with the corrected reference electrical potential Vref, and outputs an amplified channel clock (LRCK) depending on the result of the comparison to the D/A converter 337, and the PLL circuits 335 and 336.

The PLL circuit 335 multiplies the frequency (44.1 kHz) of the input channel clock (LRCK) by 64 to generate a bit clock (BCK), and output the generated bit clock (BCK) to the D/A converter 337. The PLL circuit 336 multiplies the frequency (44.1 kHz) of the input channel clock (LRCK) by 256 to generate a system clock (SCK) for the D/A converter 337, and output the generated system clock (SCK) to the D/A converter 337.

The D/A converter 337 converts the digital audio signal (Dout) into the analog audio signal based on the input channel clock (LRCK), the input bit clock (BCK), and the input system clock, and outputs the analog audio signal to the low pass filter 338. A noise of the analog audio signal is removed with the low pass filter 338, and then the analog audio signal is output through the attenuator 339, the amplifier 340, and the speaker 5.

According to the transmitting apparatus 2 in FIG. 7A and the receiving apparatus 3 in FIG. 7B, the digital audio signal is balanced-transmitted to the receiving apparatus 3 via a pair of signal lines in the LAN cable 10, and the channel clock (LRCK) is unbalanced-transmitted to the receiving apparatus 3 via the same pair of signal lines. The digital audio signal is received with the differential signal receiving circuit 331, and is input to the D/A converter 337 via the comparator 333. The channel clock (LRCK) is received with the differential signal receiving circuit 332, and is input to the D/A converter 337 via the comparator 334. Then, the reference electrical potential Vref of the comparator 334 is corrected such that the reference electrical potential Vref of the comparator 334 becomes half or approximately half of the amplitude of the channel clock (LRCK) depending on the electrical potential change of the output of the differential signal receiving circuit 332. The bit clock and the system clock are generated based on the channel clock output from the comparator 334. The digital audio signal (Dout) is converted into the analog audio signal based on the channel clock (LRCK), the bit clock (BCK), and the system clock, and then the converted analog audio signal is output.

It is therefore possible to transmit the audio signal with a pair of signal lines included in a network cable. Regardless of existence or nonexistence of the FGs (frame grounds) of the transmitting apparatus 2 and the receiving apparatus 3, the channel clock (LRCK) is accurately transmitted from the transmitting apparatus 2 to the receiving apparatus 3, so that the generation of a noise caused in a conventional signal transmission system can be prevented.

Also, the transmitting apparatus 2 transmits the image signals to the receiving apparatus 3 via the three pairs of signal lines in the LAN cable 10, and transmits the audio signal to the receiving apparatus 3 via the remaining pair of signal lines in the LAN cable 10, so that the transmitting apparatus 2 can transmit the image signals and the audio signal to the receiving apparatus 3 with only the single LAN cable 10.

Figure 8A:
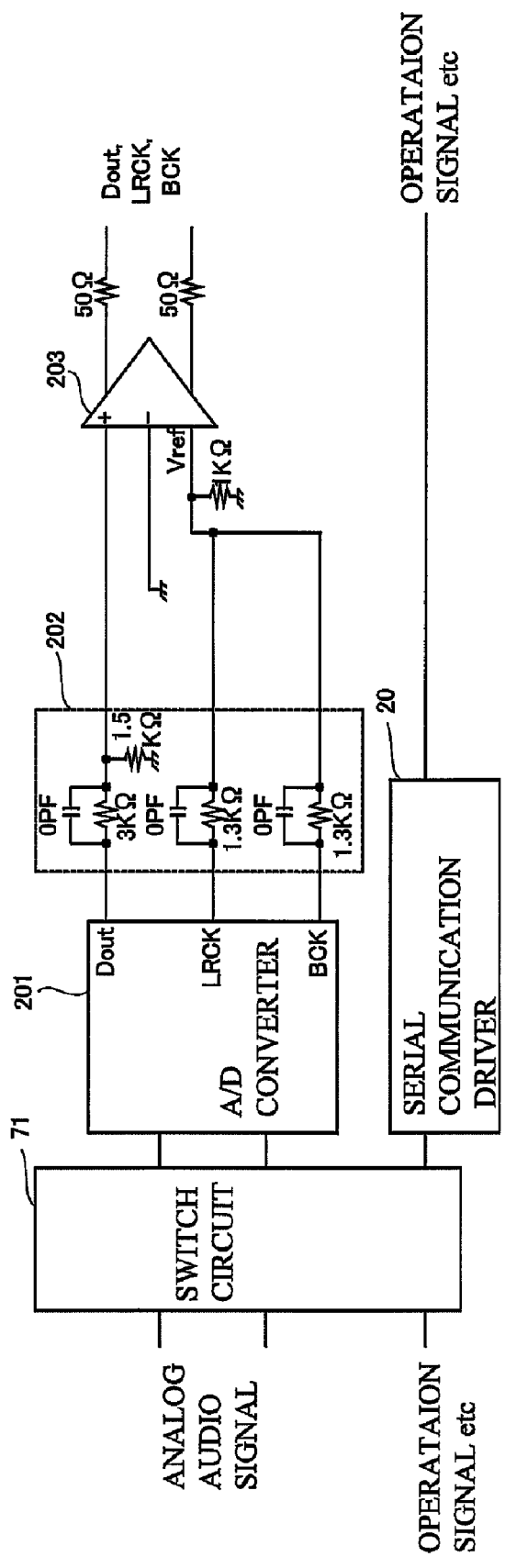
FIG. 8A is a block diagram showing a second variation of the construction of the transmitting apparatus 2 relating to the audio signal.
Figure 8B:
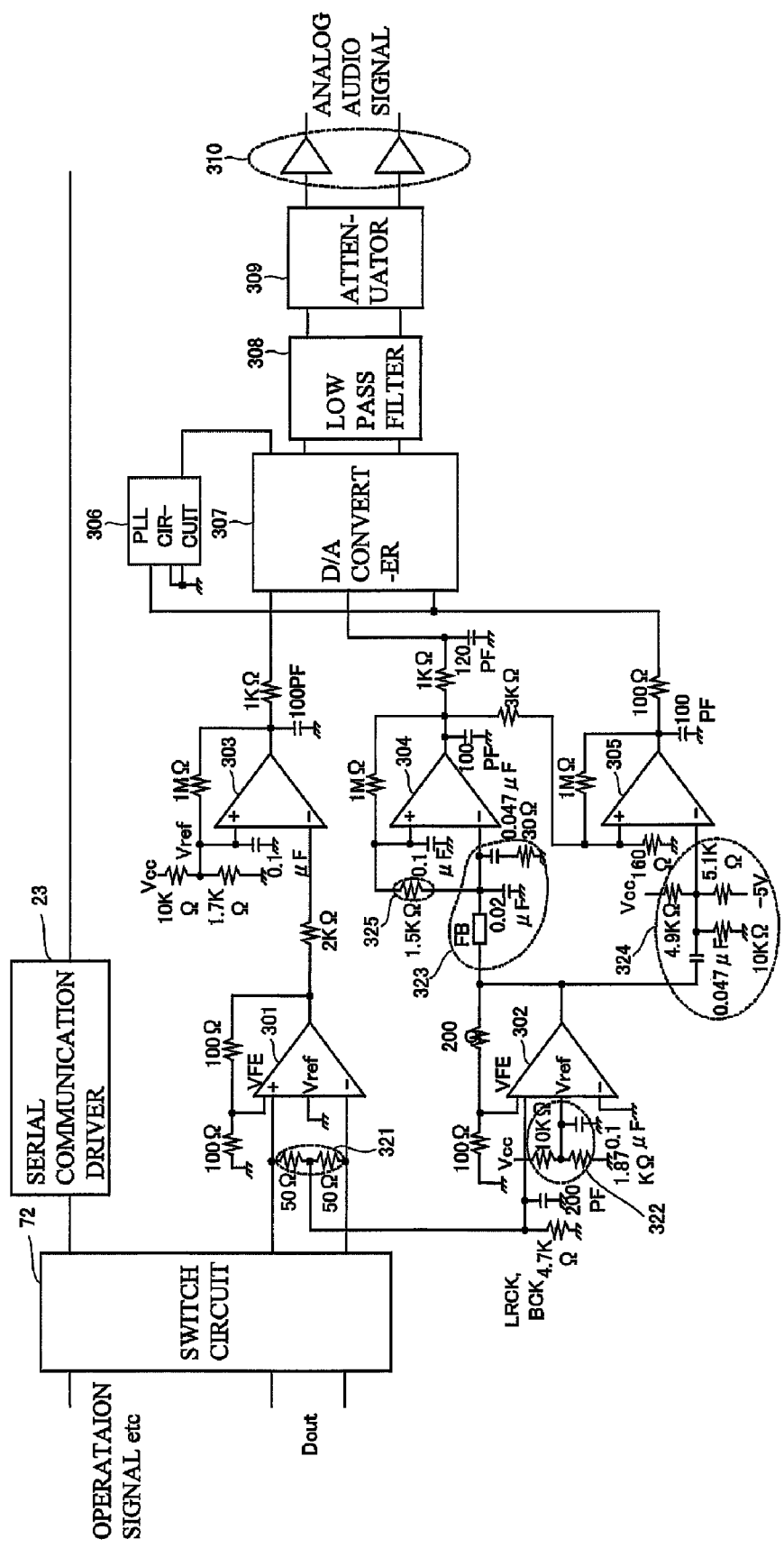
FIG. 8B is a block diagram showing a second variation of the construction of the receiving apparatus 3 relating to the audio signal.

FIG. 8A is a block diagram showing a second variation of the construction of the transmitting apparatus 2 relating to the audio signal. FIG. 8B is a block diagram showing a second variation of the construction of the receiving apparatus 3 relating to the audio signal.

As shown in FIG. 8A, the transmitting apparatus 2 includes a switch circuit 71 for selectively switching the serial communication driver 20 or the A/D converter 201 to each other. Thereby, a user can switch a purpose of a pair of signal lines in the LAN cable 10 to any one of the transmission of the operation signal of the keyboard/mouse 6 or the transmission of the digital audio signal. As shown in FIG. 8B, the receiving apparatus 3 includes a switch circuit 72 for selectively switching the serial communication driver 23 or the D/A converter 307 to each other. Thereby, the user can switch the purpose of the pair of signal lines in the LAN cable 10 to any one of the transmission of the operation signal of the keyboard/mouse 6 or the transmission of the digital audio signal. When the switch circuit 71 selects the serial communication driver 20, the switch circuit 72 selects the serial communication driver 23. When the switch circuit 71 selects the A/D converter 201, the switch circuit 72 selects the D/A converter 307.

The transmitting apparatus 2 in FIG. 7A and the receiving apparatus 3 in FIG. 7B also may include the switch circuits 71 and 72, respectively.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A signal transmission system including a receiving apparatus and a transmitting apparatus, comprising:
    the transmitting apparatus including:
        an A/D converter that converts an analog audio signal into a digital audio signal, and outputs the digital audio signal, a channel clock, and a bit clock; and
        a differential signal transmitting circuit that balanced-transmits the digital audio signal to the receiving apparatus via a pair of signal lines in a network cable, mixes the channel clock and the bit clock, and unbalanced-transmits the mixed channel clock and the mixed bit clock to the receiving apparatus via the pair of signal lines; and
    the receiving apparatus including:
        a first differential signal receiving circuit that receives the digital audio signal via the pair of signal lines;
        a second differential signal receiving circuit that receives the mixed channel clock and the mixed bit clock via the pair of signal lines;
        a first separation circuit that separates the channel clock from an output of the second differential signal receiving circuit;
        a second separation circuit that separates the bit clock from an output of the second differential signal receiving circuit;
        a first comparator that compares an output of the first differential signal receiving circuit with a reference electrical potential, and outputs an amplified digital audio signal depending on the result of the comparison;
        a second comparator that compares an output of the first separation circuit with a reference electrical potential, and outputs an amplified channel clock on the result of the comparison;
        a third comparator that compares an output of the second separation circuit with a reference electrical potential, and outputs an amplified bit clock on the result of the comparison;
        a correction circuit that corrects the reference electrical potential of the second comparator such that the reference electrical potential of the second comparator becomes half or approximately half of an amplitude of the channel clock depending on an electrical potential change of the output of the second differential signal receiving circuit;
        a PLL circuit that converts a frequency of the bit clock output from the third comparator to generate a system clock; and
        a D/A converter that converts the digital audio signal output from the first comparator into an analog audio signal based on the channel clock output from the second comparator, the bit clock output from the third comparator, and the system clock generated with the PLL circuit, and outputs the analog audio signal.

2. The signal transmission system as claimed in claim 1, wherein the transmitting apparatus transmits the digital audio signal and an image signal to the receiving apparatus via the network cable.

3. The signal transmission system as claimed in claim 1, wherein the transmitting apparatus includes a first switch circuit that selectively switches a signal which flows to the pair of signal lines to the digital audio signal or an operation signal from the receiving apparatus,
    the receiving apparatus includes a second switch circuit that selectively switches a signal which flows to the pair of signal lines to the digital audio signal or the operation signal,
    when the first switch circuit selects the digital audio signal, the second switch circuit selects the digital audio signal, and
    when the first switch circuit selects the operation signal, the second switch circuit selects the operation signal.

4. A signal transmission system including a receiving apparatus and a transmitting apparatus, comprising:
    the transmitting apparatus including:
        an A/D converter that converts an analog audio signal into a digital audio signal, and outputs the digital audio signal, and a channel clock; and
        a differential signal transmitting circuit that balanced-transmits the digital audio signal to the receiving apparatus via a pair of signal lines in a network cable, and unbalanced-transmits the channel clock to the receiving apparatus via the pair of signal lines; and
    the receiving apparatus including:
        a first differential signal receiving circuit that receives the digital audio signal via the pair of signal lines;
        a second differential signal receiving circuit that receives the channel clock via the pair of signal lines;

a first comparator that compares an output of the first differential signal receiving circuit with a reference electrical potential, and outputs an amplified digital audio signal depending on the result of the comparison;

a second comparator that compares an output of the second differential signal receiving circuit with a reference electrical potential, and outputs an amplified channel clock on the result of the comparison;

a correction circuit that corrects the reference electrical potential of the second comparator such that the reference electrical potential of the second comparator becomes half or approximately half of an amplitude of the channel clock depending on an electrical potential change of the output of the second differential signal receiving circuit;

a PLL circuit that converts a frequency of the channel clock output from the second comparator to generate a bit clock and a system clock; and a D/A converter that converts the digital audio signal output from the first comparator into an analog audio signal based on the channel clock output from the second comparator, and the bit clock and the system clock generated with the PLL circuit, and outputs the analog audio signal.

5. The signal transmission system as claimed in claim 4, wherein the transmitting apparatus transmits the digital audio signal and an image signal to the receiving apparatus via the network cable.

6. The signal transmission system as claimed in claim 4, wherein the transmitting apparatus includes a first switch circuit that selectively switches a signal which flows to the pair of signal lines to the digital audio signal or an operation signal from the receiving apparatus, the receiving apparatus includes a second switch circuit that selectively switches a signal which flows to the pair of signal lines to the digital audio signal or the operation signal, when the first switch circuit selects the digital audio signal, the second switch circuit selects the digital audio signal, and when the first switch circuit selects the operation signal, the second switch circuit selects the operation signal.

7. A receiving apparatus comprising:
a first differential signal receiving circuit that receives a digital audio signal from a transmitting apparatus via a pair of signal lines in a network cable;
a second differential signal receiving circuit that receives a mixed channel clock and a mixed bit clock via the pair of signal lines;
a first separation circuit that separates a channel clock from an output of the second differential signal receiving circuit;
a second separation circuit that separates a bit clock from an output of the second differential signal receiving circuit;
a first comparator that compares an output of the first differential signal receiving circuit with a reference electrical potential, and outputs an amplified digital audio signal depending on the result of the comparison;
a second comparator that compares an output of the first separation circuit with a reference electrical potential, and outputs an amplified channel clock on the result of the comparison;
a third comparator that compares an output of the second separation circuit with a reference electrical potential, and outputs an amplified bit clock on the result of the comparison;
a correction circuit that corrects the reference electrical potential of the second comparator such that the reference electrical potential of the second comparator becomes half or approximately half of an amplitude of the channel clock depending on an electrical potential change of the output of the second differential signal receiving circuit;
a PLL circuit that converts a frequency of the bit clock output from the third comparator to generate a system clock; and
a D/A converter that converts the digital audio signal output from the first comparator into an analog audio signal based on the channel clock output from the second comparator, the bit clock output from the third comparator, and the system clock generated with the PLL circuit, and outputs the analog audio signal.

8. The receiving apparatus as claimed in claim 7, wherein the transmitting apparatus transmits the digital audio signal and an image signal to the receiving apparatus via the network cable.

9. The receiving apparatus as claimed in claim 7, wherein the transmitting apparatus includes a first switch circuit that selectively switches a signal which flows to the pair of signal lines to the digital audio signal or an operation signal from the receiving apparatus, the receiving apparatus includes a second switch circuit that selectively switches a signal which flows to the pair of signal lines to the digital audio signal or the operation signal, when the first switch circuit selects the digital audio signal, the second switch circuit selects the digital audio signal, and when the first switch circuit selects the operation signal, the second switch circuit selects the operation signal.

10. A receiving apparatus, comprising:
a first differential signal receiving circuit that receives a digital audio signal from a transmitting apparatus via a pair of signal lines in a network cable;
a second differential signal receiving circuit that receives a channel clock via the pair of signal lines;
a first comparator that compares an output of the first differential signal receiving circuit with a reference electrical potential, and outputs an amplified digital audio signal depending on the result of the comparison;
a second comparator that compares an output of the second differential signal receiving circuit with a reference electrical potential, and outputs an amplified channel clock on the result of the comparison;
a correction circuit that corrects the reference electrical potential of the second comparator such that the reference electrical potential of the second comparator becomes half or approximately half of an amplitude of the channel clock depending on an electrical potential change of the output of the second differential signal receiving circuit;
a PLL circuit that converts a frequency of the channel clock output from the second comparator to generate a bit clock and a system clock; and
a D/A converter that converts the digital audio signal output from the first comparator into an analog audio signal based on the channel clock output from the second comparator, and the bit clock and the system clock generated with the PLL circuit, and outputs the analog audio signal.

11. The receiving apparatus as claimed in claim 10, wherein the transmitting apparatus transmits the digital audio signal and an image signal to the receiving apparatus via the network cable.

12. The receiving apparatus as claimed in claim 10, wherein the transmitting apparatus includes a first switch circuit that selectively switches a signal which flows to the pair of signal lines to the digital audio signal or an operation signal from the receiving apparatus, the receiving apparatus includes a second switch circuit that selectively switches a signal which flows to the pair of signal lines to the digital audio signal or the operation signal, when the first switch circuit selects the digital audio signal, the second switch circuit selects the digital audio signal, and when the first switch circuit selects the operation signal, the second switch circuit selects the operation signal.

* * * * *